United States Patent [19]
Jesadanont

[11] Patent Number: 5,746,467
[45] Date of Patent: May 5, 1998

[54] AUTOMATIC SAFETY CAR SEAT USING TENSION SPRINGS

[76] Inventor: Mongkol Jesadanont, 386/2 Soi Chalermsuk, (Pahonyothin 28), Jatujak, Bangkok 10900, Thailand

[21] Appl. No.: 698,669

[22] Filed: Aug. 16, 1996

Related U.S. Application Data

[62] Division of Ser. No. 535,868, Sep. 28, 1995.

[51] Int. Cl.$^6$ ....................................................... B60N 2/02
[52] U.S. Cl. ........................................ 296/68.1; 297/216.13
[58] Field of Search .................................. 296/68.1, 65.1; 297/468, 469, 470

[56] References Cited

U.S. PATENT DOCUMENTS

| | | | |
|---|---|---|---|
| 2,818,909 | 1/1958 | Burnett | 155/9 |
| 2,823,730 | 2/1958 | Lawrence | 155/9 |
| 3,578,376 | 5/1971 | Hasegawa | 296/65 |
| 3,610,679 | 10/1971 | Amato | 296/65 A |
| 3,762,505 | 10/1973 | Morse | 188/1 C |
| 3,957,304 | 5/1976 | Koutsky et al. | 297/385 |
| 3,998,291 | 12/1976 | Davis | 180/91 |
| 4,657,297 | 4/1987 | Ishibashi | 296/63 |
| 4,819,278 | 4/1989 | Ramos | 4/254 |
| 5,011,181 | 4/1991 | Laucht et al. | |
| 5,203,600 | 4/1993 | Watanabe et al. | 296/68.1 |
| 5,251,931 | 10/1993 | Semchena et al. | |
| 5,340,185 | 8/1994 | Vollmer | |
| 5,409,262 | 4/1995 | McLennan | |
| 5,411,319 | 5/1995 | Kuiri | |
| 5,449,214 | 9/1995 | Totani | 296/68.1 |

FOREIGN PATENT DOCUMENTS

0 529 265 A1   7/1992   European Pat. Off.

*Primary Examiner*—David M. Mitchell
*Assistant Examiner*—Jonathan J. Yun

[57] ABSTRACT

The automatic safety seat in a vehicle are designed to minimize the seriousness of car-crash injuries during a frontal collision. When the vehicle collides against other vehicle at a relative velocity of 40 Km/h or up, the backrest is pushed to recline backward by action of springs and various mechanisms designed. A tension spring is one of the most important part used to bring the backrest to a reclining position. Collision results in pulling the upper part of occupants fastened by designed safety-belts to the backrest to recline backwards to the rearmost. Thus, pelvis, chest and head of the occupant are moved away to the farmost and can avoid striking with deforming frontal parts of the intruding car by frontal collision. Chest injuries and brain damage can be avoided.

1 Claim, 8 Drawing Sheets

AUTOMATIC SAFETY CAR SEAT USING TENSION SPRINGS

CROSS REFERENCE TO RELATED APPLICATION

This is a divisional patent application of co-pending application Ser. No. 08/535,868 filed Sep. 28, 1995.

BACKGROUND OF THE INVENTION

No type of car accident results in a greater hazard to drivers than a frontal collision. Presently, several safety features have been developed to reduce injuries to the occupants during a frontal collision. Several safety devices like the seat-belts with modifications (U.S. Pat. Nos. 5,411,319 and EP 0 529 265 A1 ), and the air bags (U.S. Pat. Nos. 5,409,262; 5,251,931 and 5,011,181) have been used. Those air bags are mostly installed in the interior of the steering wheel assembly which is most prone to serious damage upon a frontal collision. Those actuated electronically can be easily damaged during a collision. These all result in too many reports on failure of the air bag. Besides, at high speeds as or over 40 Km/h upon collision, the impact is so great that the air bag itself can cause serious damage to the occupant's body. Improvements have been made to vehicle seats to minimize the damage to the occupant. What currently proposed is to bring the occupant's body especially upper part and head away the farmost to avoid striking with deforming frontal part of the car. Lifting mechanisms has been described (U.S. Pat. No. 5,340,185) for raising a front edge section of a seat cushion. The design is too complex and questionable for functioning during a critical moment.

Accordingly, there is a need for a simple, inexpensive, yet highly effective means to minimize injuries to an occupant in a vehicle upon a frontal collision. This invention proposes a system to fulfill such need.

SUMMARY OF THE INVENTION

The automatic seats in a vehicle designed to minimize the seriousness of car-crash injuries during a frontal collision are described. A seat cushion is connected at its posterior end to a backrest whose two flanking steel bars each having a circular hole fits pivotally onto a cylindrical shaft protruding upright on the surface of each of the two thick steel plates mounted under the left and the right edges of the seat cushion. The backrest is held slightly reclining tightly in place via a spring of predetermined stiffness. Spring of tension type can be used. When the vehicle collides against the other vehicle or any other stationary object at a relative velocity of 40 Km/h or up, the backrest is pushed to recline backward by the action of the springs together with various mechanisms especially designed. The collision results in pulling the upper part of the body of the driver or the occupants fastened by the presently designed safety-belts to recline backwards to the rearmost. Thus, the pelvis, the chest and the head of an occupant sitting on this automatic safety car seat are moved away to the farmost and thus, can avoid striking with the deforming frontal parts of the car intruding by the frontal collision. The chest injuries and the brain damage can then be effectively avoided.

DESCRIPTION OF THE PREFERRED EMBODIMENTS:

The present inventions are the automatic safety car seats for front compartments of a vehicle for minimizing the seriousness of collision injuries. Upon a frontal collision of the vehicle, the backrests are pulled to recline backward to the rearmost. This movement pulls the upper part of the occupants' bodies, from pelvis up to head, fastened by the safety-belts to the backrest to recline backward to the rearmost. Therefore, the pelvis, the chest and the head of the occupants are moved away from the intruding deforming steering wheel or the intruding frontal parts of the car. Thus, hitting of the head against the steering wheel which occurs in most car collisions even in the best designed cars and causes most of the time serious brain damage and death can be avoided.

In an event of frontal collision, the safety standard considered by most automobile manufacturers presently would regard the velocity of 45 Km/h to be the safest velocity to all the occupants fastened with the seat-belts, with or without the air bag. At a collision velocity greater than 45 Km/h, the situation is regarded as a severe collision such that the occupant may be seriously injured or even fatal.

The present invention of the automatic safety seat in the vehicle is to minimize the severity of injuring to all the occupants in the vehicle in an event of frontal collision at a velocity of 40 Km/h or up where this lowest velocity may be reduced to any velocity such as 30 Km/h depends on the presetting of various parameters such as the stiffness of the spring and the adjustment of the initial force within the spring.

In what have been described above and to be described further,

1. 'The relative velocity' means a velocity resulting from the frontal collision of a car.

For example, a car is moving at a velocity 25 Km/h, an occupant in this car is also moving at 25 Km/h. In an event of frontal collision to another car moving in an opposite direction at 15 Km/h, 'the relative velocity' of the car and its occupant resulting from the collision is then equal to 25+15=40 Km/h. If a car together with its occupant are moving at a velocity of 40 Km/h and the car collides against a rigid wall (having a velocity of 0), 'the relative velocity' of the car or its occupant resulting from the collision is then equal to 40+0=40 Km/h.

"If the car collides at a collision velocity 40 Km/h" means that the collision occurs at 'a relative velocity' of the car or its occupant of 40 Km/h.

"If the car collides at a collision velocity above 40 Km/h" means that the collision occurs at 'a relative velocity' of the car or its occupant of over 40 Km/h.

"If the car collides at a collision velocity 40 Km/h or" up means that the collision occurs 'at a relative velocity' of the car or its occupant of 40 Km/h or up.

2. 'Collision' means frontal collision.

3. 'The steel bars 530' means both steel bars flanking a backrest.

4. 'The safety-belts' means both safety-belts 216 and 218.

5. 'The strap locks 219' means both strap locks 219 A and 219 B.

6. 'The automatic tensioner sets' means both seat-belt tensioner sets 212 A and 212 B.

The important mechanism of this invention is the spring used which can be one of either of the two types below:

1. a tension spring, or 2. any other elastics or other mechanisms that can serve the same purpose can also be used.

The details of presently designed automatic safety car seat are described.

An Automatic Safety Car Seats for Occupants in the Front Compartment of the Car using the Tension Spring:

All parts of the automatic safety car seat 511 except the seat cushion, the backrest, and the safety-belts are made of steel. A backrest 213 is fixed as shown in FIG. 1 between two long rectangular steel bars 530 on the left side and the right side of the occupant.

Figure 1:
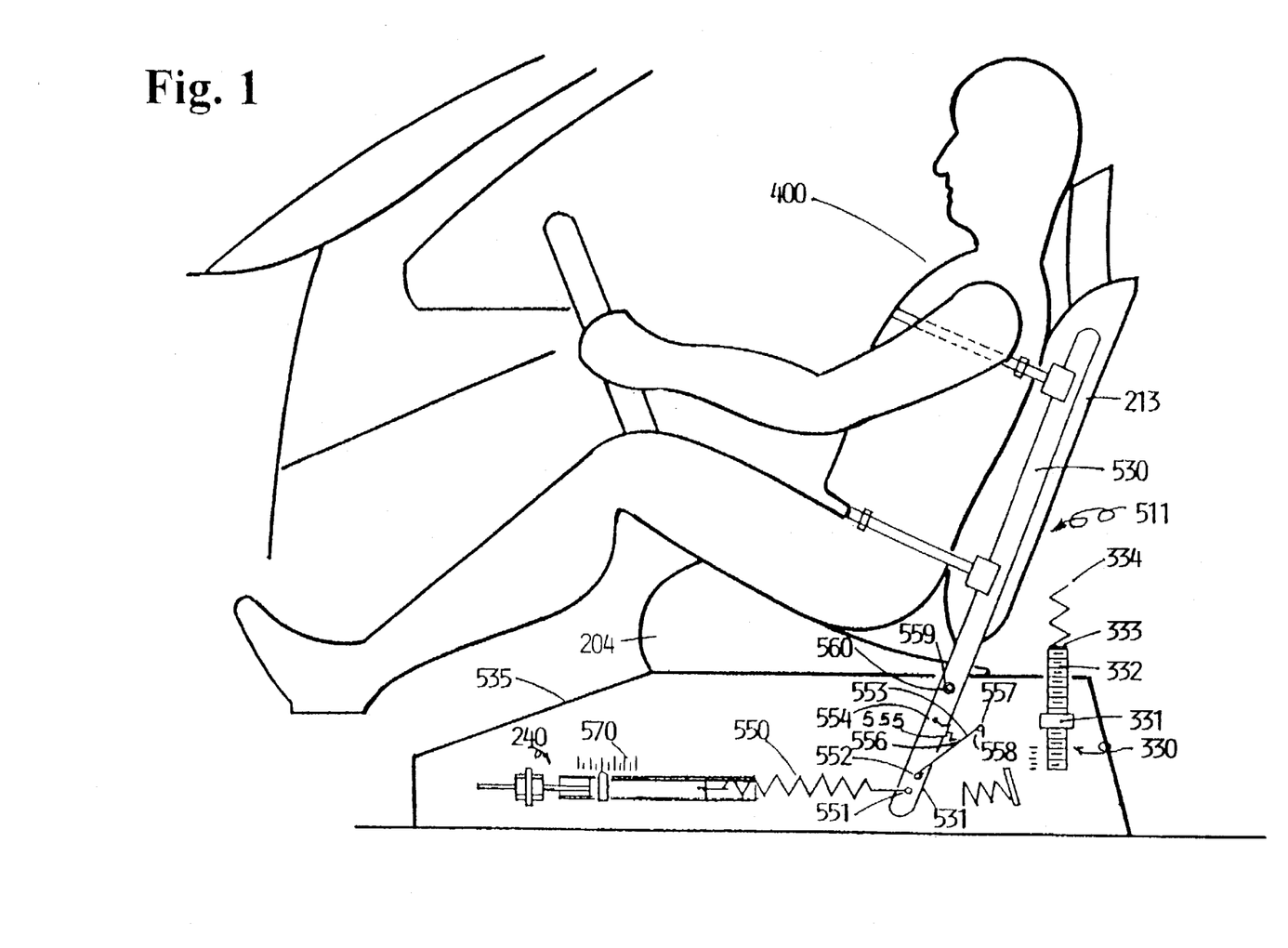
FIG. 1 shows the occupant, sitting on the automatic safety car seat of the tension spring type for the front compartment of the car, while the car is moving at any velocity and the collision has not yet occurred.

As in FIG. 1 on the steel bar 530 at the level of the occupant's chest, there is a conventional automatic seat-belt tensioner set, 212 A where the inner end of the safety-belt 216 is spooled inside with outer end extended outside the tensioner. This automatic seat-belt tensioner set, 212 A is used for the safety-belt at the chest level of the occupant. At the pelvis level of the occupant, there is another conventional automatic seat-belt tensioner set, 212 B fixed to the rectangular steel bar 530 where the inner end of the safety-belt 218 is spooled inside with outer end extended outside the tensioner. This automatic seat-belt tensioner set, 212 B is used for the safety-belt at the pelvis level of the occupant. Both automatic seat-belt tensioners are of conventional type and would function to restrain the occupant to the backrest when the collision occurs at about 10 Km/h or up. FIG. 1 shows an occupant fastened at his chest level with a safety-belt 216, and at his pelvis with a safety-belt. 218 to the backrest 213. Each of the safety-belts has a strap-lock. The other ends of safety-belt 216 and safety-belt 218 are fixed to the rectangular steel bar 530 on the right at the short axles 215 and 217, respectively.

As shown in FIGS. 1, 2, 3 and 4, there are two thick steel plates 535, each tightly supports under each side on the left or the right of the seat cushion 204 and vertically mounted tightly to the floor of the car. Both steel plates 535 and each of their mechanical parts to be described below are in duplicate.

The spring used in this type of automatic safety car seat is a tension spring set 550. One end of this spring set is engaged to the closed circular loop 243 of a force-adjusting set, while the other end is fixed tightly round the steel axle 551 at the lowest end of the steel bar 530. Slight above the axle 551 is another axle 552 where the lower end of a hook 553 winds around and turns pivotally about this axle 552. Above the axle 552 is another steel axle 554 to which having one end of a tension spring 555 wound round. The other end of the spring 555 is connected to the middle of the hook 553 at position 556. The curving end 557 of the hook 553 engages onto the axle 558 on the steel plate 535.

On the steel bar 530 just above axle 554, there is a round hole 559 through which a cylindrical steel shaft 560 of the steel plate 535 pivotally fits in. The steel bar 535 can turn pivotally around this steel shaft 560 which acts as the axis of rotation.

In a normal condition where collision has not yet occurred (FIG. 1), the occupant 400 sitting on this automatic safety car seat 511, has been fastened properly with safety-belts. The car is moving and collision has not yet occurred. A force-adjusting set 240 is adjusted to give a proper initial tension force within the tension spring 550 according to the occupant's body weight. This causes increase in the length of the tension spring 550 from the original position where there is not yet any external force exerted upon.

Figure 7:
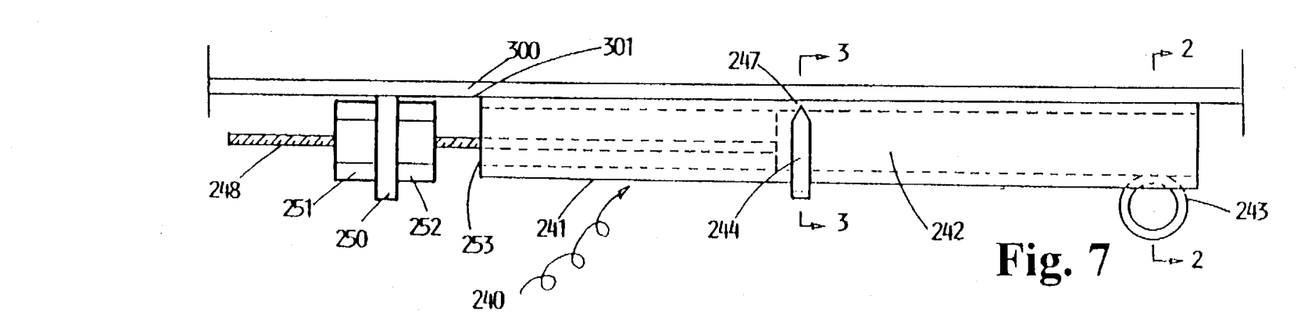
FIG. 7 is a top-view of the force-adjusting set.
Figure 8:
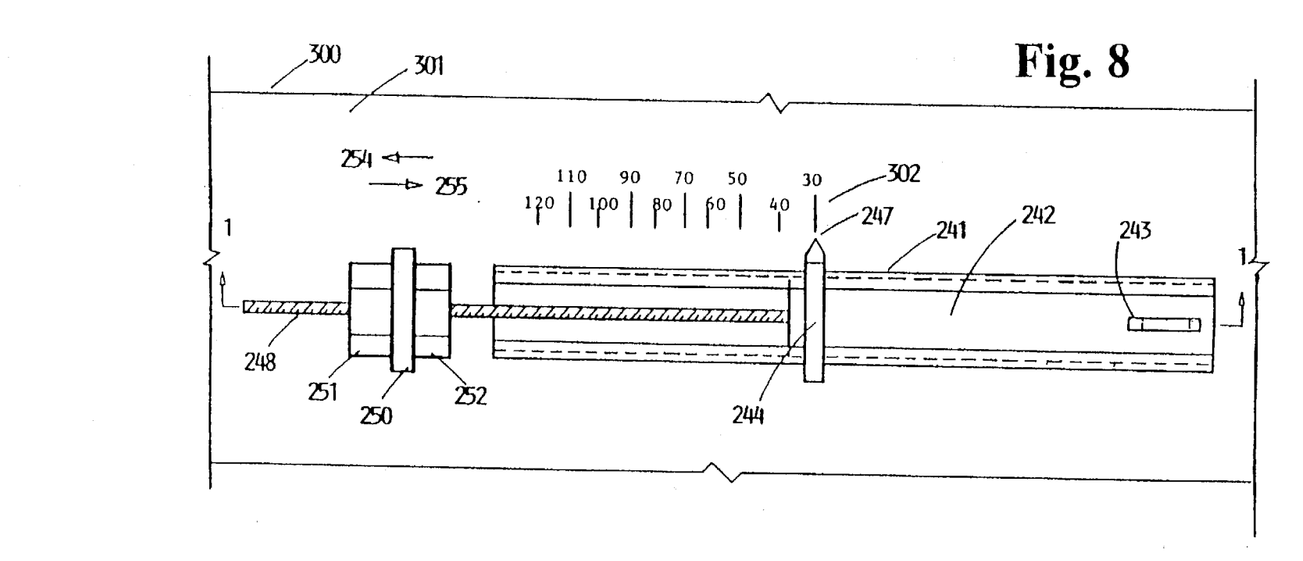
FIG. 8 is a side view of FIG. 7 showing the scale with the numbers labeled indicating the different body weights of the occupants on the automatic seat.
Figure 9:
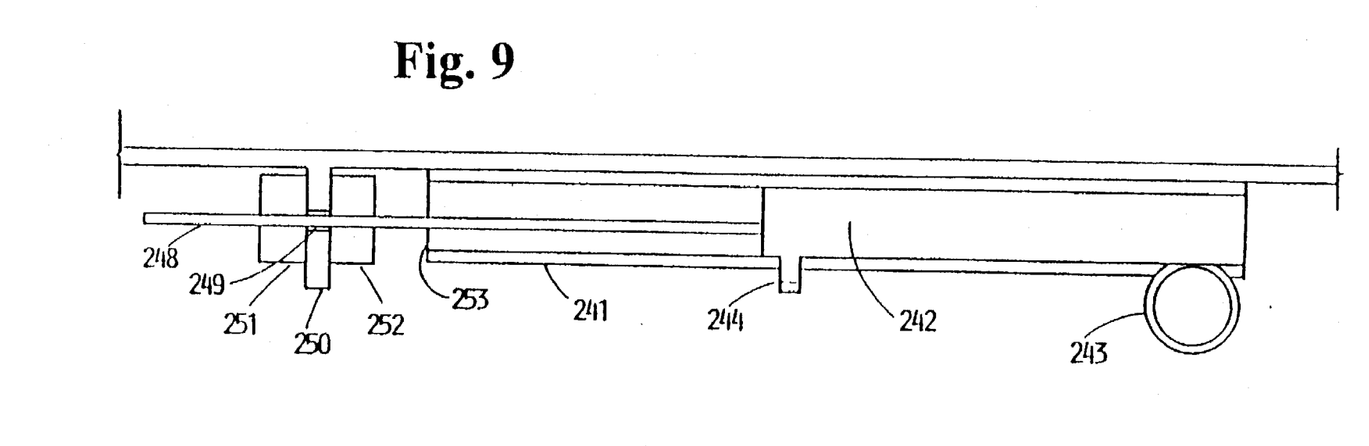
FIG. 9 is a sectional view of FIG. 7 along line 1—1 of FIG. 8.

The force-adjusting set 240 is for adjusting the initial tension forces in the tension spring set 550 which vary proportionally to the different body weights of the occupants sitting on this automatic safety car seat (see FIGS. 7–9).

Figure 9A:
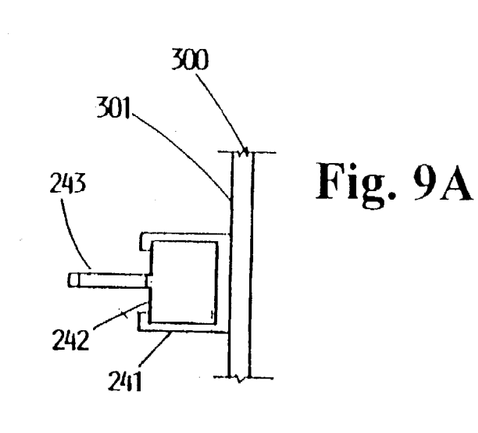
FIG. 9A is a sectional view of a slidable steel bar at a position where a closed circular loop is mounted onto, along line 2—2 of FIG. 8.

The force-adjusting set 240 is composed of a steel rail 241 whose cross-section is of C-shape with its back mounted tightly and horizontally onto the steel plate 535. A slidable steel bar 242 is placed inside the rail 241 and can move freely and horizontally along the rail 241. At the posterior end on the outer surface of the slidable steel bar 242 is a closed-circular loop 243 to be engaged with the anterior end of the tension spring set 550. FIG. 9A is a cross-sectional view of the slidable steel bar 242 along line 2—2 in FIG. 7 at the position where the closed-circular loop 243 is mounted tightly onto.

Figure 9B:
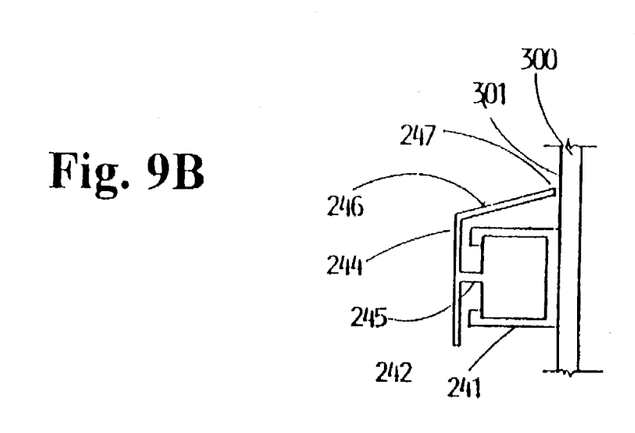
FIG. 9B is a sectional view of a slidable steel bar at a position where a cursor is mounted onto, along line 3—3 of FIG. 8.

Near the anterior end of the slidable steel bar, there is a cursor 244 made of steel fixed onto the outer surface of the steel bar through its base 245 having the upper part 246 of the cursor 244 bent at an angle of about 110 degrees to bring its arrow head 247 close to the surface of the steel plate 535 and to point to a number on a scale indicating the body weight of the occupant on the automatic safety seat. FIG. 9B shows a cross-sectional view of the slidable steel bar along line 3—3 in FIG. 7 at the position where the cursor 244 is fixed to.

The anterior end of the slidable steel bar 242 is extended out as a long steel rod 248 having the external threads. The long steel rod 248 lies horizontally and parallelly to the surface of steel plate 535.

The long steel rod 248 inserts through a circular hole 249 of a small steel plate 250 which is mounted perpendicularly onto the surface of the steel plate 535 where the diameter of the circular hole 249 is just slightly greater than the diameter of the long steel rod 248.

The steel rod 248 is fixed tightly with the small steel plate 250 by two hexagonal head nuts 251 and 252 flanking both sides of the plate 250 where the external threads of the steel rod 248 mate tightly with the internal threads of the two nuts.

The slidable steel bar 242 together with the cursor 244 and the long steel rod 248 can move to and fro horizontally by adjusting the two nuts 251 and 252.

The nut 252 when turned tightly onto the steel plate 250 is at a distance of at least 5 centimeters anterior to the end 253 of the steel rail 241 as shown in FIG. 8 to allow turning of the nut 252 conveniently along the steel rod 248 when adjusting the tension force within the tension spring set 550 where one end of the spring set is engaged to the closed-circular loop 243 of this force-adjusting set 240.

About 5 centimeters posterior to the end 253 of the steel rail 241, there is a vertical line of the scale 570 on the surface of steel plate 535 representing the maximum body weight of the occupant to be seated on the safety car seat 511.

The arrow head 247 of the cursor 244 points to the scale 570 on surface of the steel plate 535. Scale 570 is a scale showing the different body weights of the occupants in kilograms.

The construction of this scale 570 is one of the most important part of the invention to be described in details.

Assuming the length of the spring 550 increases $x_1$ meters from the original condition to create an initial tension force of F newtons within the tension spring 550. The arrow head 247 points then at the position M Kg. on the scale 570. This weight M Kg. is the body weight of the occupant 400 sitting on the automatic safety car seat 511.

Figure 2:
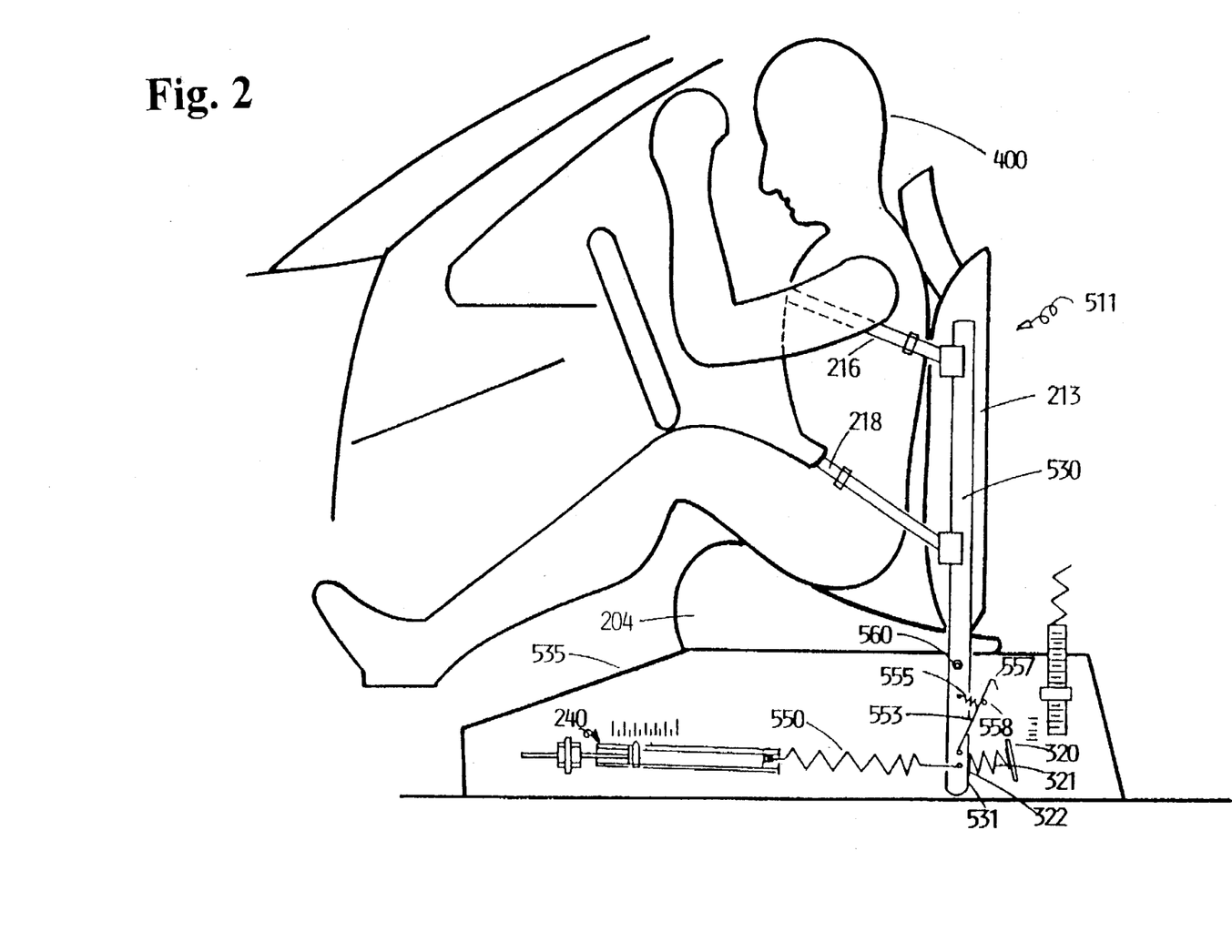
FIG. 2 shows the occupant, sitting on the automatic safety car seat of the tension spring type, when the collision velocity is 40 Km/h.

According to FIG. 2, in an event of frontal collision at the velocity of the car, 40 Km/h (which is also equal to the velocity of the occupant, $V_1$); the kinetic energy of a moving mass, i.e. the occupant 400 which is properly fastened with the safety-belts to the backrest 213, is converted to enormous impact energy. The belt tensioner 212 then automatically pulls the seat-belt tight in a space of milliseconds. The occupant 400 thrusts forward and pulls backrest 213 to move pivotally too. The occupant together with the backrest and the steel bar 530 are then pulled forward by this enormous impact energy with axle 560 as the pivoting axle of the steel bar 530. The tension force within the tension spring set 550 constructed to have a predetermined stiffness, K, causes the deceleration of the moving mass until they all stop for a very short time. Thus the final velocity of the occupant $V_2$ is 0. In this situation the lowest part 531 of the steel bar 530 just touches the outermost spring coil 322 of the compression spring 321 where compression has not yet occurred. At this point as shown in FIG. 2, assuming the spring 550 stretches out an additional length of 0.06 meter. Therefore, the length that spring 550 has been stretched from the original condition=$x_1$+0.06 meter.

Figure 4:
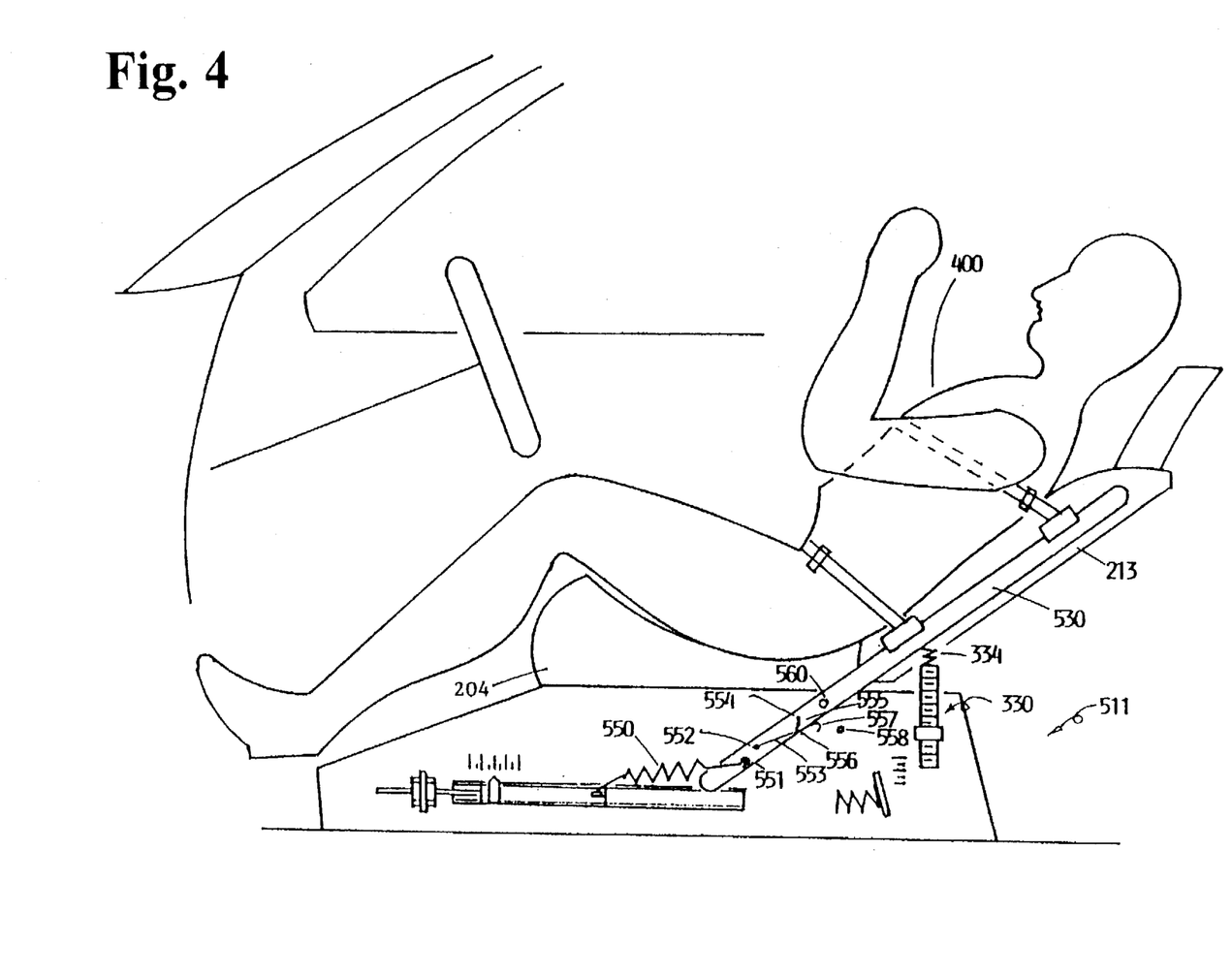
FIG. 4 shows the backrest of the automatic safety car seat of the tension spring type together with the occupant which have been drawn to recline backward to the rearmost, after the collision occurred at 40 Km/h or up.

As the steel bar 530 is moving forward pivotally around the axle 560 of steel plate 535, the axle 558 pushes the hook 553 then upward and lifts the curving end 557 up until it is disengaged from the axle 558. The spring 555 thus draws the hook 553 away from the axle 558 to allow the drawing of the steel bar 530 together with the backrest 213 and the occupant 400 by the tension spring set 550 to recline backward as shown in FIG. 4 until the lowest end of steel bar 530 compresses onto the compression spring 334 which functions as a force absorber.

Coil 322 is the outermost spring coil of the spring set 321. The spring set 321 is to absorb the impact and to limit the inclination angle of the steel bar 530 thrusting pivotally towards the anterior of the car together with the occupant fastened by the safety-belts 216 and 218 at the time the collision occurs at a collision velocity of over 40 Km/h. The lowest part of the steel bar 530 is to be pressed onto this spring 321. In a normal situation while no collision occurs, the lowest part of the steel bar 530 is located anterior to and at an appropriate distance away from the spring 321.

On steel plate 535 to the rear of steel plate 320, there is a force-absorbing spring set 330. A small thick steel block 331 is fixed tightly and perpendicularly to the surface the steel plate 535 having internal threads. The internal threads mates tightly with external threads of a thick steel rod 332 to fit the steel rod 332 in a vertical position. At the upper end 333 of the steel rod 332 there is a compression spring 334 which fixed tightly onto the top. This spring 334 is to absorb the impact force which occurs at the time the steel bar 530 together with the backrest 213 and the fastened occupant are drawn backward by the tension spring set 550 when collision occurs at 40 Km/h and up.

On the steel plate 535, downward right below the steel rod 332 there is a scale 336 to indicate the degree that the steel bar 530 would make an reclining angle to the horizontal when being drawn backward by the tension spring set 550 to press to the farmost onto the compression spring 334. Adjusting the reclining angle can be done by screwing the steel rod 332 up or down to have the lowest end of the steel rod 332 as a pointer points to the degree of the reclining angle on the scale 336.

Figure 3:
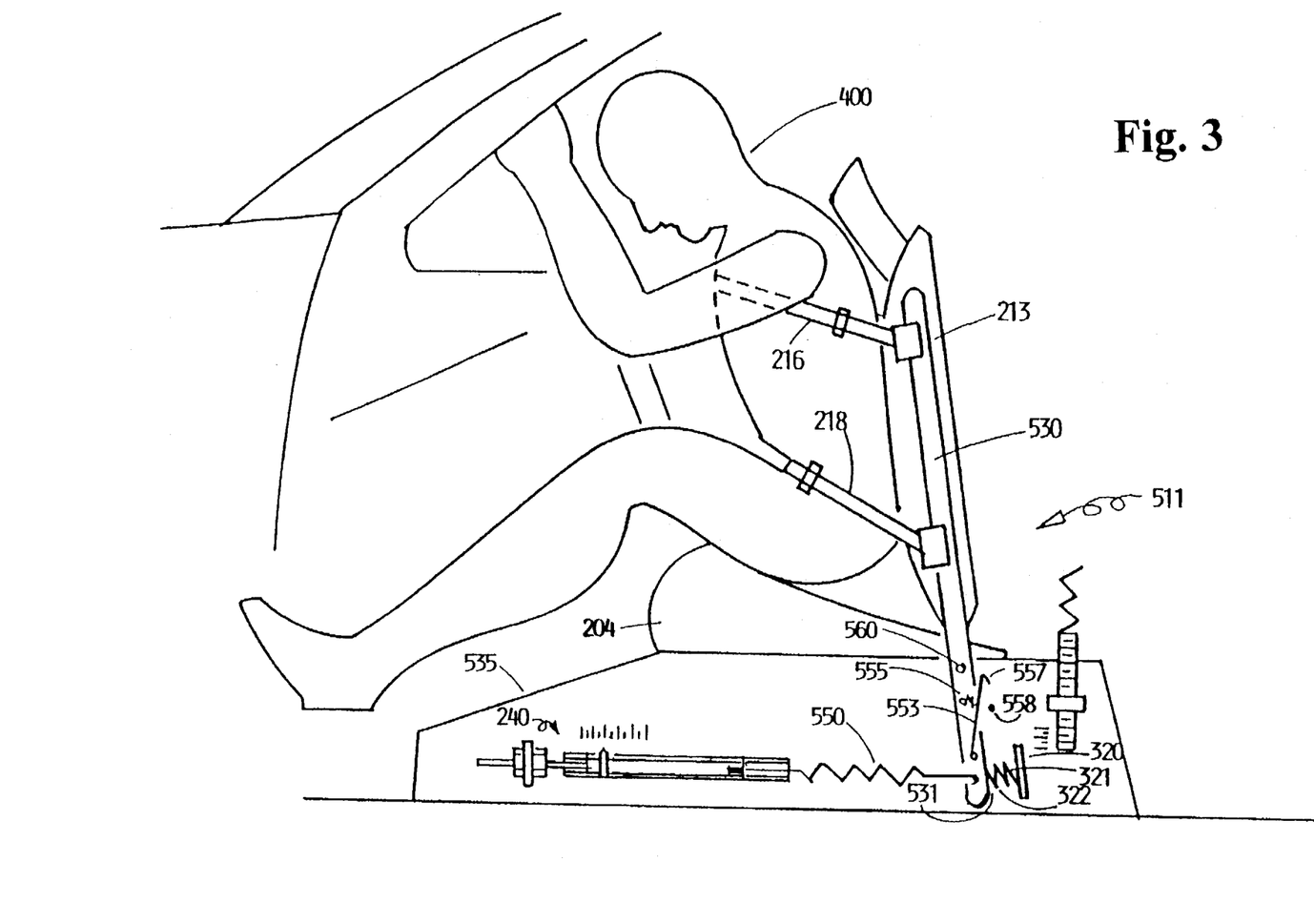
FIG. 3 shows the automatic safety car seat of the tension spring type together with the occupant, when the collision velocity is over 40 Km/h.

According to FIG. 3, in an event of frontal collision at any velocity above 40 Km/h no matter how great an impact energy resulting from the collision would be; the occupant 400 together with the backrest are pulled pivotally forward until the lowest part 531 of the steel bar 530 compresses the spring 321 tightly against the steel plate 320. The spring 321 functions to reduce the impact of steel bar 530 and halts the steel bar 530 together with the backrest 213 and the occupant 400 not to move any further, thus stop for a moment. In the mean time, the spring 555 has already pulled the hook 553 away from engaging with the axle 558. The tension spring 550 then pulls the axle 551 at the lower part of the steel bar 530 causing the pivoting movement of the steel bar 530 around the axle 560 to recline backward together with the backrest 213 and the occupant 400 as shown in FIG. 4 until the steel bar 530 presses on the spring 334 which is the force absorber.

Calculations for all the values, $x_1$, $x_2$ and F:
From the work- energy equation,
$$-\tfrac{1}{2} K (x_2^2 - x_1^2) = \tfrac{1}{2} m(V_2^2 - V_1^2)$$
or $-\tfrac{1}{2} K (x_2^2 - x_1^2) = 1/2(M/2)(V_2^2 - V_1^2)$
where, K is the linear stiffness of the tension spring, newtons per meter,
i.e., the force in newtons that pulls the tension spring out 1 meter which is a constant for each spring set.
$x_1$ is the distance the tension spring is pulled extended by the force-adjusting set from the normal resting position when there has not yet been any forces exerted upon.

From the condition set above in FIG. 2, when a collision occurs at a velocity 40 Km/h, assuming
$x_2 = x_1 + 0.06$ meter
$V_1 = 40$ Km/h, or $= 11.11$ meters/sec
$V_2 = 0$ From,
$-\tfrac{1}{2} K (x_2^2 - x_1^2) = \tfrac{1}{2} (M/2)(V_2^2 - V_1^2)$
therefore,
$-\tfrac{1}{2} K\{(x_1 + 0.06)^2 - x_1^2\} = \tfrac{1}{2} (M/2)(0^2 - 11.11^2)$
$-\tfrac{1}{2} K(0.12x_1 + 0.0036) = \tfrac{1}{2} (M/2)(0^2 - 11.11^2)$
$-\tfrac{1}{2} K(0.12x_1 + 0.0036) = -\tfrac{1}{2} (M/2)(123.4321)$
∴ $\tfrac{1}{2} K(0.12x_1 + 0.0036) = \tfrac{1}{2} (M/2)(123.4321)$
$\tfrac{1}{2} K(0.12x_1 + 0.0036) = 30.858M$  (1)
If, $M = 120$ Kg., $x_1 = 0.1$ meter
therefore,
$\tfrac{1}{2} K(0.12 \times 0.1 + 0.0036) = 30.858 \times 120$
$K = 474,738.46$ newtons/meter
$= 474,738.46/9.81$ Kg./meter
$= 48,393.32$ Kg./meter Substitute $K = 474,738.46$ newtons/meter in Equation (1) then, ½ 474,738.46(0.12x$_1$ + 0.0036) = 30.858 M
        x$_1$ = 0.0010833 M − 0.03       (2)

From Equation (2) when M is known, x$_1$ can be calculated and the value 2F can be calculated from the Equation
    2F = 2Kx$_1$
For example, if,   M = 30 Kg.
From Equation (2), then
    x$_1$ = 0.00245 meter
Thus,   2F = 2 × 48,393.32 × 0.00245
       = 237.12 Kg.
if,   M = 60 Kg.
From Equation (2), then
    x$_1$ = 0.03499 meter
Thus,   2F = 2 × 48,939.32 × 0.03499
       = 3,386.56 Kg.

Constructing of Scale 570 of the Automatic Safety Car Seat using Tension Spring Set:

Before the construction of a scale 570 for adjusting the initial tension force within the tension spring set, the value x$_1$ must be first calculated.

Table 1 in the following page shows the values of x$_1$ for the different occupants sitting on the automatic safety car seat of tension spring sets type, having the body weights of M from 30, 32, 34, 36, 38, . . . or 120 Kg.

In the calculation for all the values to contruct the scale either for the seats of torsion or tension spring types described above, the body weights used in the calculation do not include the weight of the backrest which is negligible comparing with the body weight of the occupant. In case if the weight of the backrest is to be included in the calculation, then the total weight, W, must be used in the calculation instead of M, where the total weight, W=the body weight, M, of the occupant+the weight of the backrest of which the weight of the backrest is a constant value.

Figure 5:
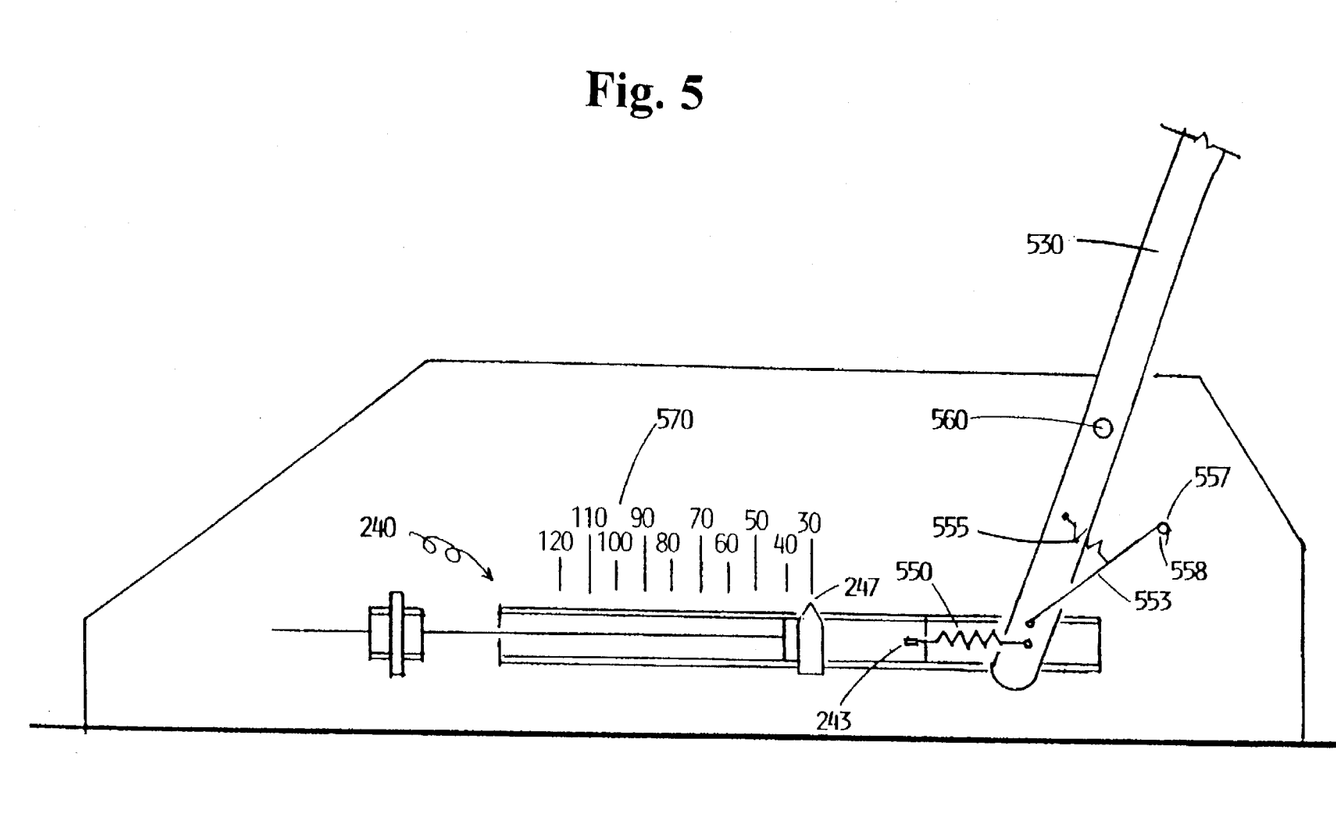
FIG. 5 shows how to draw a scale for adjusting the initial tension forces in the tension spring set corresponding to the different body weights of the occupants sitting on the automatic safety car seat.
Figure 6:
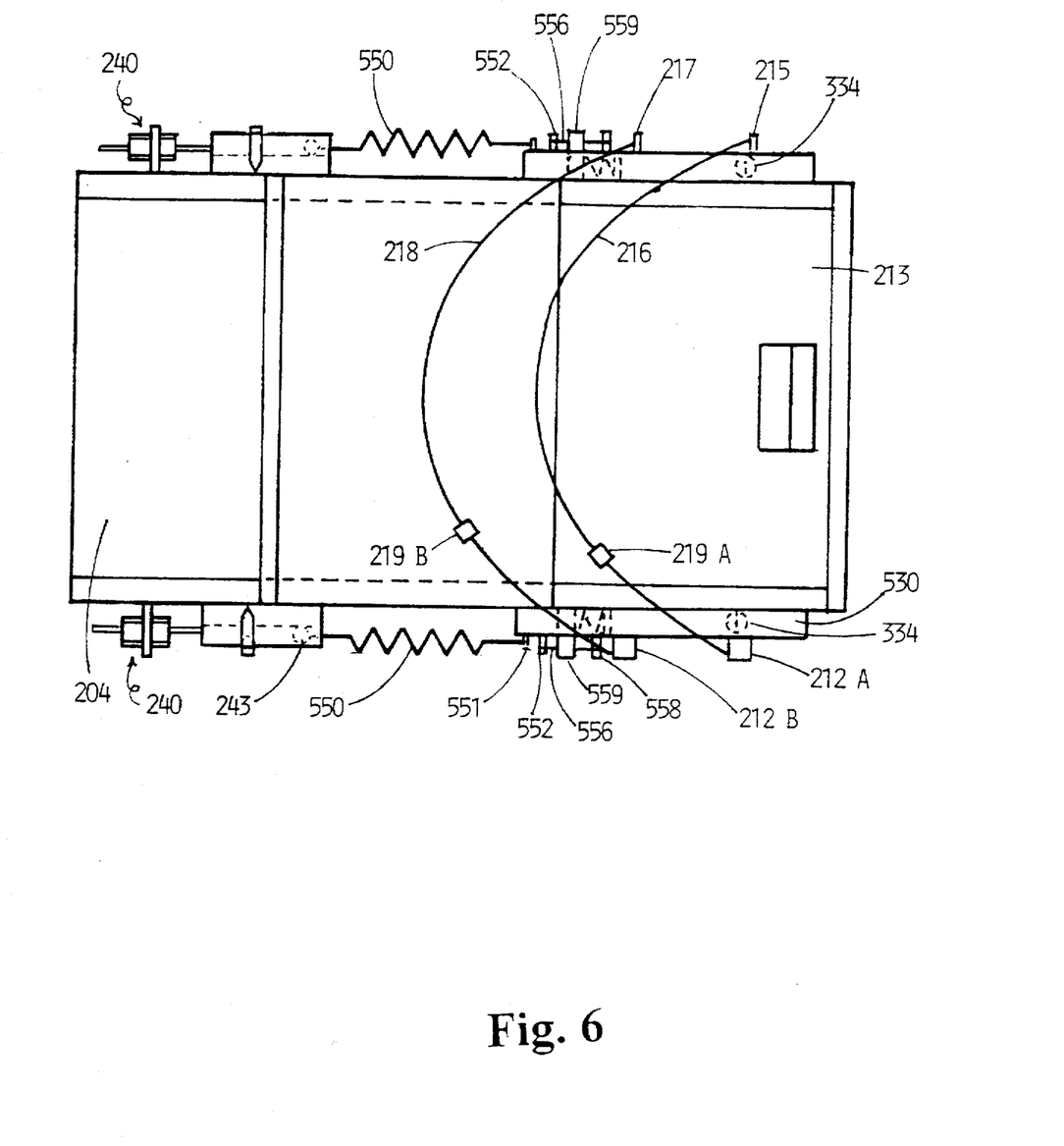
FIG. 6 is a top-view of the automatic safety car seat using the tension spring sets for front seat occupant showing the locations of all the mechanisms.

After the value x$_1$ is obtained as shown in Table 2, the following steps must be performed, as shown in FIG. 5.

1. At all the time during the constructing of this scale 570, the curving end 557 of the hook 553 is engaged onto the axle 558 of the steel plate 535 to restrain the steel bar 580 in place.

2. Assuming that the occupant on this seat has a body weight of 30, 40, 50, 60, 70, 80, 90, 100, 110 or 120 Kg.

3. According to Table 1, when the body weight of the occupant is 30 Kg., as shown in FIG. 5, adjust the force adjusting set 240 to pull the tension spring 550, constructed to have a predetermined stiffness as calculated above, out for a distance of 0.002499 meter from the normal resting condition where there is no external force exerted upon, until the arrow head 247 moves to a position. At this position, draw a vertical line on the flat surface 535 and write a number "30".

TABLE 2

| M Kilograms | x$_1$ Meters | M Kilograms | x$_1$ Meters | M Kilograms | x$_1$ Meters |
| --- | --- | --- | --- | --- | --- |
| 30 | 0.002499 | 60 | 0.034998 | 90 | 0.067497 |
| 32 | 0.004666 | 62 | 0.037165 | 92 | 0.069664 |
| 34 | 0.006832 | 64 | 0.039331 | 94 | 0.071830 |
| 36 | 0.008999 | 66 | 0.041498 | 96 | 0.073997 |
| 38 | 0.011165 | 68 | 0.043664 | 98 | 0.076163 |
| 40 | 0.013332 | 70 | 0.045831 | 100 | 0.078330 |
| 42 | 0.015499 | 72 | 0.047998 | 102 | 0.080497 |
| 44 | 0.017665 | 74 | 0.050164 | 104 | 0.082663 |
| 46 | 0.019832 | 76 | 0.052331 | 106 | 0.084830 |
| 48 | 0.021998 | 78 | 0.054497 | 108 | 0.086996 |
| 50 | 0.024165 | 80 | 0.056664 | 110 | 0.089163 |

TABLE 2-continued

| M Kilograms | x$_1$ Meters | M Kilograms | x$_1$ Meters | M Kilograms | x$_1$ Meters |
| --- | --- | --- | --- | --- | --- |
| 52 | 0.026332 | 82 | 0.058831 | 112 | 0.091330 |
| 54 | 0.028498 | 84 | 0.060997 | 114 | 0.093496 |
| 56 | 0.030665 | 86 | 0.063164 | 116 | 0.095663 |
| 58 | 0.032831 | 88 | 0.065330 | 118 | 0.097829 |
|  |  |  |  | 120 | 0.10000 |

4. From Table 1, when M is 40, 50, 60, 70, 80, 90, 100, 110 or 120 Kg., the value x1 is 0.01333, 0.024165, 0.03499, 0.045831, 0.05666, 0.06749, 0.07833, 0.08916, and 0.1 meter, respectively. Do similarly as in 3., until the arrow head 247 moves to different positions on the steel plate 535. Draw the vertical lines at these different positions and write the numbers: 40, 50, 60, 70, 80, 90, 100, 110 or 120, respectively.

Thus, these numbers 40, 50, 60, 70, 80, 90, 100, 110 or 120 labeling the vertical lines represent the body weights in kilograms of the occupant that he must adjust the force adjusting set 240 to pull the tension spring 550 out for a distance until the arrow head points right to the number corresponds to his body weight.

5. There are two of this scale 570 per one safety seat, each on each steel plate on each side of the safety car seat and that the occupant needs to adjust on both sides to have the arrow head points to the number corresponds to his body weight.

6. In FIG. 5, the scale is labeled ranged only from 30 up to 120 since there is limitation in space.

This automatic safety seat in the vehicle is used as follows: the occupant 400 adjusts the force-adjusting set 240 that the arrow head 247 points to a number corresponds to his body weight. He sits on the safety seat 511 and fastens himself to the seat against the backrest 213 by two safety-belts 216 and 218 using the strap locks 219. He is then ready to drive his car. Notably, these two safety-belts are fastened to the two steel bars 530 on both sides of the backrest 213. This is a distinct difference than the conventional seat-belt system of which the three-point attachment is used, i.e. one to the upper part of the pillar at the middle of the chassis and the other two points on the floor which is the prior art such that there is no point attached to the backrest 213 at all. For those conventional designs, when a serious collision occurs, the front seat occupants both the driver and the front seat passenger would always strike the deformed intruding steering wheel together with the deformed dashboard while the backseat passengers would be compressed by the collapsed backrest of the front seats. These all can cause most of the time very serious injuries to the occupants as severe as brain damages, chest injuries and very often fatal consequences. This presently described invention can thus provide the occupants in the vehicle the excellent passive safety effectively with its simplicity and at very low cost of production yet the most reliable of all the passive safety available.

It will be understood that modifications may be made in the above construction without departing from the scope of this invention by one of ordinary skill in the art. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

I claim:

1. An automatic safety seat for an occupant in a front compartment of a vehicle whose backrest can recline suddenly backward upon a frontal collision of said vehicle, comprising:

a backrest that can recline backward together with an upper part of -a body of said occupant when a frontal collision occurs at a predetermined relative velocity or higher;

two long rectangular steel bars fixed tightly flanking on each side, one on the left side and one on the right side, to said backrest;

two automatic seat-belt tensioner sets on said steel bar on the left side of said backrest, one at the chest level and the other at the pelvis level of said occupant;

an upper short steel axle and a lower short steel axle on said steel bar on the right side of said backrest, one at the chest level and the other at the pelvis level of said occupant;

a seat cushion placed on and fixed tightly at its left and right edges to the top of two thick steel plates which are mounted perpendicularly and tightly to the floor of said vehicle;

two strap-type seat-belts, each together with a strap-lock to fasten the upper part of an occupant's body to said backrest, where one seat-belt is at chest level of said occupant with one end spooled inside the upper seat-belt tensioner set and the other end mounted tightly to said upper short steel axle on said right rectangular steel bar, while the other seat-belt is at the pelvis level of said occupant with one end spooled inside the lower seat-belt tensioner set and the other end mounted tightly to said lower short steel axle on said right rectangular steel bar;

a circular hole all the way through the thickness of each said rectangular steel bar at a level relatively lower than said seat-belt tensioner set or said steel axle at the pelvis level and three additional short steel axles, an upper short steel axle, a middle short steel axle and a lowest short steel axle, are arranged vertically in a row protruding out on the outer surface of each said rectangular steel bar opposite to said backrest at a level relatively lower than said circular hole:

a cylindrical steel shaft perpendicularly and integrally protruding out laterally on the surface of each said thick steel plate supporting said seat cushion which can pivotally fit into said circular hole of said rectangular steel bar;

rearwardly and lower relative to said cylindrical steel shaft on the surface of each said thick steel plate, there is a steel axle onto which a curving end of a hook is engaged where the lower end of said hook pivotally winds round said middle short steel axle at the lower end of said steel bar flanking said backrest:

a tension spring having its lower end fixed to the middle of said hook with its upper end fixed to said upper short steel axle at the lower end of each said steel bar in such a manner that there is sufficient tension force to lift the hook up when the curving end of said hook is disengaged from said steel axle on said thick steel plate:

rearwardly, at a lower level relative to said steel axle on the surface of said thick steel plate supporting said seat cushion, there is a small steel plate with a compression spring having one end fixed on the lateral surface of said small steel plate facing to the front of said vehicle with its free end pointing towards the posterior of the lowest end of said rectangular steel bar such that said lowest end presses on said compression spring to reduce the impact and limit the angle at which said steel bar moves pivotally forward and around said cylindrical shaft during a frontal collision of said vehicle:

rearwardly next to said compression spring and said small steel plate, there is a force-absorbing spring set each consists of a thick steel block mounted perpendicularly onto the surface of each said thick steel plate having a circular hole with several turns of internal threads to mate with external threads of a vertical thick steel rod with a compression spring fixed on top whose level can be adjusted by turning said thick steel rod up or down to set a predetermined angle at which each of said two steel bars together with said backrest and said fastened occupant may pivotally recline backward to the rearmost as it presses on said compression spring:

at a position relatively anterior and lower than said cylindrical shaft, there is a scale showing the numbers representing the body weights of the occupants on said surface:

at a position relatively lower than said scale, there is a force-adjusting set fixed onto the surface of said steel plate consists of:

a steel rail of C-shaped cross-section of said force adjusting spring set with its back mounted onto each said thick steel plate having a steel bar slidable and horizontally fitted along said rail where at the posterior end of said slidable steel bar there is a circular loop fixed laterally to be engaged to a circular loop at an anterior end of a tension spring whose posterior end winds tightly round the lowest short steel axle at the lower end of said steel bar, and relatively near the anterior end of said slidable steel bar there is a cursor made of steel fixed onto the surface whose arrow head points to the number on said scale indicating body weight of said occupant on said seat, and at the anterior end of said slidable steel bar is a long steel rod extended as a single piece with external threads to mate with internal threads of two hexagonal head nuts flanking a small steel plate with a circular hole in the center through which said long steel rod inserts, mounted perpendicularly to said steel plate supported said seat cushion, where moving of said long steel rod to and fro horizontally is possible by adjusting said two hexagonal head nuts and that said occupant must adjust said two head nuts to pull said arrow head cursor to point at a number on said scale corresponds to his body weight before using said automatic safety seat.

* * * * *